US007360219B2

(12) United States Patent
Rhine

(10) Patent No.: US 7,360,219 B2
(45) Date of Patent: Apr. 15, 2008

(54) SYSTEMS AND METHODS FOR FACILITATING FAIR AND EFFICIENT SCHEDULING OF PROCESSES AMONG MULTIPLE RESOURCES IN A COMPUTER SYSTEM

(75) Inventor: Scott Alan Rhine, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 251 days.

(21) Appl. No.: 10/318,822

(22) Filed: Dec. 13, 2002

(65) Prior Publication Data

US 2004/0117790 A1  Jun. 17, 2004

(51) Int. Cl.
*G06F 9/46* (2006.01)

(52) U.S. Cl. .................. 718/104; 718/102

(58) Field of Classification Search ......... 718/102–104
See application file for complete search history.

(56) References Cited

U.S. PATENT DOCUMENTS

| 4,318,182 | A | * | 3/1982 | Bachman et al. ........... 718/105 |
| 6,038,214 | A | * | 3/2000 | Shionozaki ................ 370/230 |
| 6,665,760 | B1 | * | 12/2003 | Dotson .................... 710/240 |
| 6,859,926 | B1 | * | 2/2005 | Brenner et al. ............. 718/100 |
| 7,020,878 | B1 | * | 3/2006 | Rhee et al. ................ 718/104 |
| 7,036,123 | B2 | * | 4/2006 | Dorofeev et al. ........... 718/102 |
| 2002/0024936 | A1 | * | 2/2002 | Yamamoto ................. 370/252 |

* cited by examiner

*Primary Examiner*—Meng-Al T. An
*Assistant Examiner*—Camquy Truong

(57) ABSTRACT

A computer-implemented method for distributing processes among a plurality of resources is disclosed. The processes are associated with a plurality of priority groups. The method includes ascertaining whether a first priority group of the plurality of priority groups is rich, the first priority group of the plurality of groups being deemed rich if the first priority group is entitled to at least a whole one of the plurality of resources, the first priority group of the plurality of groups being deemed poor if the first priority group is entitled to less than the whole one of the plurality of resources. The method also includes distributing processes of the first priority group among at least a first subset of the plurality of resources in accordance with a first computer-implemented methodology if the first priority group is deemed a rich. The method additionally includes distributing processes of the first priority group among at least a second subset of the plurality of resources in accordance with a second computer-implemented methodology if the first priority group is deemed poor, the second computer-implemented methodology being different from the first computer-implemented methodology.

29 Claims, 6 Drawing Sheets

Inputs: list of priority groups
configuration sequence number
list of processes
resource_count (CPUs)

Outputs: assignment of processes to resources (CPUs)
LASTRESOURCEUSED (group) array

US 7,360,219 B2

SYSTEMS AND METHODS FOR FACILITATING FAIR AND EFFICIENT SCHEDULING OF PROCESSES AMONG MULTIPLE RESOURCES IN A COMPUTER SYSTEM

BACKGROUND OF THE INVENTION

As computer systems grow more powerful, there are more resources to handle an ever increasing number of computing jobs or processes. By way of example, there are computer systems (stand-alone systems and/or networked systems) provisioned with hundreds of processors (CPUs), multiple database connections, multiple disk channels, and/or a large number of network links. These computers systems are required to handle computing needs of modern enterprises, which may involve handling a large number of processes concurrently.

Generally speaking, when multiple processes are present, these multiple processes compete against each other for these resources, and there is a corresponding need to schedule processes for execution on the available resources. Take the case of CPU resources, for example. Although the discussion herein focuses on CPU resources to simplify the discussion, it should be borne in mind that the problems discussed and the solutions offered herein are not limited to CPUs but are applicable to any resource that needs to be shared by different processes. One of the simplest ways to implement scheduling is to employ a single global queue to dispatch the next process to any CPU that can satisfy some predefined rule for fair allocation. However, the single global point of access can become contentious, particularly for a large computer system with a large number of CPUs, and performance may suffer. The single global queue approach is also particularly difficult to scale since changed global data must be communicated to all CPUs in the system. As the number of CPUs or processes increase, the performance penalty becomes prohibitive using the single global queuing approach.

One way to avoid the performance penalty associated with the single global queue approach is to employ multiple local queues, e.g., by provisioning each CPU with a local queue, and to manage each local queue independently. This decoupled approach tends to be more efficient in terms of low processing overhead but fairness frequently suffers.

One decoupled scheduling approach is round-robin scheduling. In pure round-robin scheduling, processes are assigned to the next CPU queue in a circular fashion. Thus, if there are 10 CPUs, the first process will be assigned to the first CPU, the second process will be assigned to the second CPU, and so forth. After the last CPU is reached on the tenth process, the first CPU is again assigned to the eleventh process, and hence the name round-robin.

A priority group refers to a plurality of processes having certain commonalities such that these processes can be grouped together and prioritized similarly for execution purposes. Priority grouping capability is offered by many vendors of schedulers, and many customers demand this capability. Having resource groups adds an extra dimension of complexity. If we had one member of each group in each CPU queue, then fairness would be easy. Each CPU could be handled with complete independence and achieve perfect fairness. As long as the group has at least on representative on each CPU queue, the algorithm is fair from the point of view of the group. But on the higher CPU count machines, every priority group will not have enough processes to populate every CPU. This increasingly common sub-case is called being under-committed. The round-robin approach tends to suffer a significant lack of fairness when priority groups are under-committed.

For example, if a group is entitled to 5% of a 100 CPU system, but only has 5 jobs running, it will expect to receive 5% because it is physically possible. In the unmodified round-robin scheme, every group starts distribution on the same CPU 0 and counts forward. Therefore, even in the under-committed case, the first few CPUs are likely to have members of every group and the later CPUs will be very sparsely populated. The net effect of this in the completely decoupled queue scheme is that the group would only get 5% of those 5 CPUs, or 0.25%. Jobs on the fully loaded CPUs would follow the fairness rules, while the ones on their own CPUs take everything. Some CPUs might go altogether idle. All the groups would underachieve their goals.

As a further example, assume that the reason for limiting the smallest group to 5% was that it was greedy and needed to be held back or it would take over the system. If the group contains enough processes to occupy every CPU, this group which is supposed to be limited could take over 53% of the total system. There are many corner cases which demonstrate that the isolated pure round-robin solution is not fair.

Other approaches such as batch scheduling, periodic rebalancing, credit/debit schemes, idle stealing, or robin hood scheduling also suffer from various deficiencies in fairness and/or performance, particularly when priority groups are involved. Many of these approaches require active compensation and/or management by the operating system (OS), thereby tending to increase the cost of scheduling and/or rendering these approaches difficult to scale to meet the needs of computer systems having a large number of resources and/or priority groups and/or processes. In particular, any scheme that relies on stealing of processes from one CPU by another ruins the cache performance and temporarily stops work on all CPUs involved. Maintaining CPU affinity for individual processes and minimal intrusion are critical for performance. But the fundamental premise of most of these schemes is that all processes are equivalent, which directly contradicts the need for fairness between the groups. The length of individual queues may have no relevance to the relative priority of its processes. The need for thinking in both axes, fairness and performance, simultaneously necessitates a new solution.

SUMMARY OF THE INVENTION

The invention relates, in one embodiment to a computer-implemented method for distributing processes among a plurality of resources, the processes being associated with a plurality of priority groups. The method includes ascertaining whether a first priority group of the plurality of priority groups is rich, the first priority group of the plurality of groups being deemed rich if the first priority group is entitled to at least a whole one of the plurality of resources, the first priority group of the plurality of groups being deemed poor if the first priority group is entitled to less than the whole one of the plurality of resources. The method also includes distributing processes of the first priority group among at least a first subset of the plurality of resources in accordance with a first computer-implemented methodology if the first priority group is deemed a rich. The method additionally includes distributing processes of the first priority group among at least a second subset of the plurality of resources in accordance with a second computer-implemented methodology if the first priority group is deemed poor, the second computer-implemented methodology being different from the first computer-implemented methodology.

In another embodiment, the invention relates to an article of manufacture comprising a program storage medium having computer readable codes embodied therein. The computer readable codes are configured for distributing processes among a plurality of resources, the processes being associated with a plurality of priority groups. The computer readable codes include computer readable codes for ascertaining whether a first priority group of the plurality of priority groups is rich. The first priority group of the plurality of groups is deemed rich if the first priority group is entitled to at least a whole one of the plurality of resources. The first priority group of the plurality of groups is deemed poor if the first priority group is entitled to less than the whole one of the plurality of resources. There are included computer readable codes for distributing processes of the first priority group among at least a first subset of the plurality of resources in accordance with a first methodology if the first priority group is deemed a rich. There are also included computer readable codes for distributing processes of the first priority group among at least a second subset of the plurality of resources in accordance with a second methodology if the first priority group is deemed poor, the second methodology being different from the first methodology.

In yet another embodiment, the invention relates to a computer system having therein a plurality of resources for sharing by a plurality of processes. Processes in the plurality of processes are associated with a smaller plurality of priority groups. Processes in a first priority group of the plurality of priority groups are serviced by at least a first group of resources of the plurality of resources. The processes in the first priority group are distributed among resources of the first group of resources in a round-robin fashion starting from a first starting resource of the first group of resources. Processes in a second priority group of the plurality of priority groups are serviced by at least a second group of resources of the plurality of resources. The processes in the second priority group are distributed among resources of the second group of resources in a round-robin fashion starting from a second starting resource of the first group of resources. The first priority group has a higher priority than the second priority group with respect to the plurality of resources. The second starting resource is different from the first starting resource.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
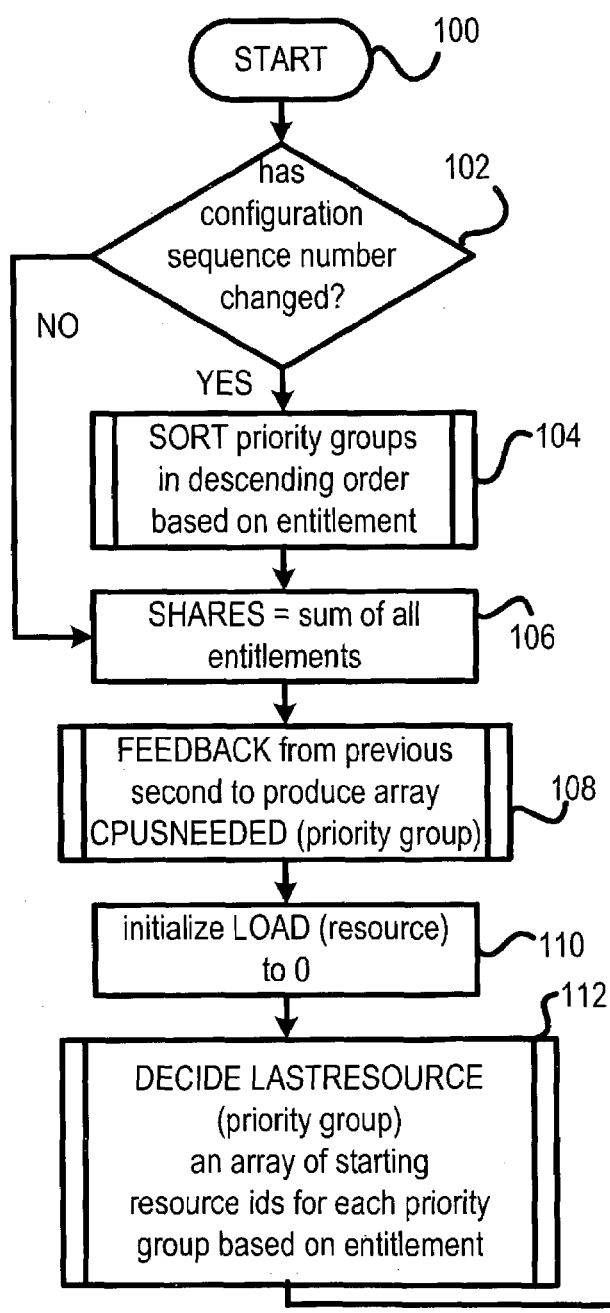
FIG. 1 illustrates, in accordance with one embodiment of the present invention, the major steps of the inventive distributing algorithm.
Figure 1:
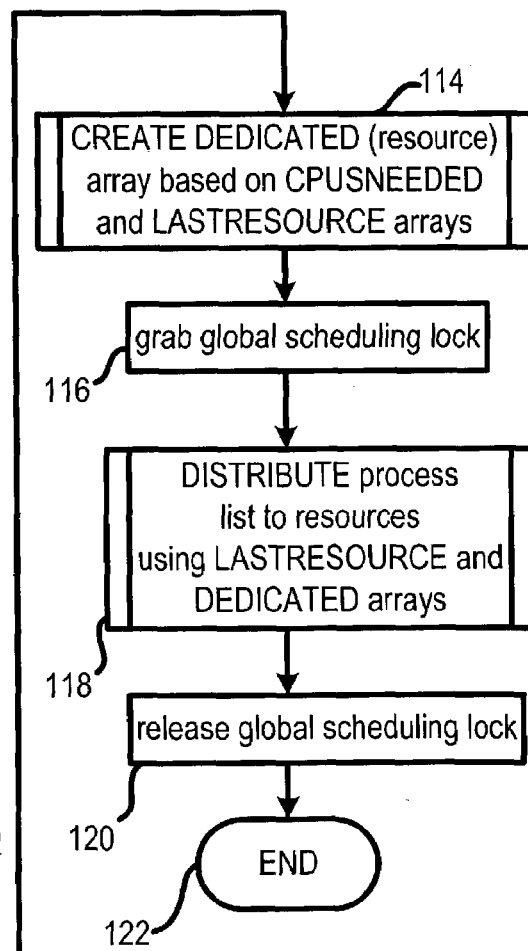

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is provided an innovative distributing technique for distributing processes (i.e., jobs) associated with different priority groups to the computer system resources with a high degree of fairness and efficiency. In this context, fairness relates to the ability of the distributing technique to achieve as closely as possible the prioritization goals for the priority groups. Efficiency, on the other hand, relates to the ability of the distributing technique to distribute processes to the resources with minimal time and resource overhead. The invention seeks to improve both fairness and efficiency simultaneously.

Furthermore, the inventive distributing algorithm is designed to distribute any number of processes for any number of priority groups into any set of resources independent of the scheduling mechanism (if any) employed by the operating system. In most cases, the workload distribution achieved by the inventive distributing algorithm allows the OS to perform very simple, if any at all, scheduling and/or compensation to bring the actual prioritization achieved by the various priority groups inline with the expected prioritization. In this respect, the scheduling itself becomes passive, with the work ensuring fairness being performed when processes are distributed to resources in accordance with the inventive distributing algorithm.

Interestingly, as the number of resources (such as the number of CPUs) and/or the number of priority groups increases, the degree of fairness achieved by the inventive distributing technique increases instead of decreasing as would be expected with prior art scheduling techniques. In this sense, the inventive distributing technique is highly scalable to large systems having a large number of resources and/or handling a large number of priority groups and/or processes.

In one embodiment of the invention, fairness is inherently achieved by intelligently determining the starting resource at which a given priority group may begin the round-robin distribution of priority group processes. As mentioned earlier, there is a statistical tendency to overload certain resources in pure round-robin scheduling (i.e., always starting the assigning at the first resource). If there is a group of 10 CPUs and a priority group X is entitled to 50% of the system CPU capacity, it may be more fair to start the round-robin distribution of processes in priority group X at the fifth CPU instead of at the first CPU automatically as would have been done in the prior art pure round-robin approach.

As is well known, the prioritization associated with individual priority groups may be specified in various ways. Although there are many ways to specify the prioritization, the discussion herein will employ entitlement percentages to specify prioritization in order to simplify the discussion. It should be kept in mind that the invention is applicable to any priority group prioritization schemes and is not limited to schemes specifying prioritization by entitlement percentages. Furthermore, although the discussion focuses on CPU in the examples given and the figures, the invention is applicable to any type of resource that needs to be shared among many priority groups and/or processes.

In accordance with one aspect of the present invention, a priority group that satisfies an entitlement criterion of having a minimum of one whole resource's worth of entitlement (e.g., 1 CPU worth of entitlement) is deemed a rich priority group. For example, if a system has 10 CPUs and a particular priority group is entitled to 30% of the system CPU capacity, that priority group is rich since there are 3 CPU's worth of entitlement. If a priority group fails to satisfy the above-mentioned entitlement criterion (i.e., having at least one whole resource's worth of entitlement), that priority group is deemed a poor priority group. Using the 10-CPU system example, if a priority group is entitled to 5% of the system CPU capacity, that priority group is poor since it has only half of 1 CPU worth of entitlement.

The distinction between rich priority groups and poor priority groups are relevant since these priority groups are distributed in different ways in accordance with one embodiment of the present invention. Rich priority groups take turns blocking off a collection of resources with a size based on entitlement magnitude, with the wealthiest choosing the first and best. A poor priority group has its processes assigned to resources in a different manner, for example, best fit to the remaining resources after the assignment to the rich priority groups is completed. In essence, rich priority groups are allowed to stake out various resources in places where the chance of having to share those resources with other priority groups is lower, and poor priority groups are left to compete for the leftover resources.

By determining in advance how processes in each priority group would be distributed to different resources, a roadmap for distributing is created whereby little active participation by the operating system is required in the time between executions of the distributing algorithm. If it turns out that the last execution of the distributing algorithm did not allow a certain rich priority group to achieve its expected priority, e.g., its expected entitlement of the resources, corrective actions may be taken in the current execution of the distributing algorithm. For example, certain resources (e.g., certain CPUs) may be dedicated to service only processes from a certain rich priority group to help that rich priority group better achieve its expected entitlement of the resources. In a sense, there is a feedback mechanism from one execution of the distributing algorithm to the next to improve fairness over time.

In term of efficiency, the distributing algorithm is designed to be executed infrequently to minimize impact on performance. The roadmap created for process distribution is such that there is no need to continually completely rebalance the distribution of processes to maintain fairness over time. Since changing group membership or configuration tends to be rare, the two operations that may upset this balance once established are new process forks, and existing process exits. Since exits are statistically balanced across all CPUs, process exits may not need to be addressed too often. However, in this model, newly forked processes are managed in such a way as to maintain fairness for as long as possible among the priority groups.

Furthermore, the inventive distributing algorithm does not rely on a global queue for the distribution of processes among the resources, thereby avoiding the performance penalties associated with using a global queue. Even though distributing is performed in a decoupled manner using decoupled queues at the resources themselves to improve efficiency, fairness is not unduly sacrificed. While these queues are locked globally during the actual distribution process, the distribution process itself is designed to operate efficiently so that the time spent globally locked is minimal. These and other features and advantages of various embodiments of the present invention may be better understood with reference to the figures and discussions that follow.

FIG. 1 illustrates, in accordance with one embodiment of the present invention, the major steps of the inventive distributing algorithm. Generally speaking, the distributing algorithm is designed for execution periodically, such as every second in the example associated with the figures. The algorithm takes as its inputs the list of priority groups, the configuration sequence number, and the list of processes. The configuration sequence number represents an identifier assigned each time the configuration of the priority groups changes. For example, the addition or deletion of a priority group would represent a change in configuration, and a new configuration sequence number would be assigned to identify the new configuration. As another example, the percentage of entitlement of an existing priority group may change, which causes a new configuration sequence number to be assigned.

The algorithm starts with a sorted list of priority groups, which is sorted in descending order based on some prioritization specification, such as entitlement percentage. However, if the configuration has changed since the last execution of the distributing algorithm, the priority groups may be sorted again (blocks 102 and 104). Generally speaking, any suitable sorting algorithm may be employed (including, for example, bubble sort or binary sort). With reference to Example A in the EXAMPLES section hereinbelow, an exemplary sorted list is shown in Table 1 in which priority groups 1-4 are sorted in descending order based on entitlement.

In block 106, the value of the variable SHARES is set to be equal to the sum of all entitlements. If entitlement percentages are used to specify the prioritization associated with the priority groups, SHARES would be 100 (but does not have to be if the relative priortizations are specified in other ways).

In block 108, the performance data that results from the last execution of the distributing algorithm is employed as feedback to help the current distributing to be fairer in its distribution of processes to resources. As will be seen in FIG. 2 herein, the feedback data is employed to ascertain the number of CPUs that need to be dedicated, if any, to a particular priority group to help that priority group obtain an actual entitlement that is closer to the expected entitlement.

In block 110, the array LOAD for the resources are initialized. This array is employed to track the load of the various CPUs and in particular will be used to facilitate sharing of CPUs by all poor priority groups and potentially a partial CPU left over from the lowest ranking rich priority group.

In block 112, the array of starting CPUs for the priority groups are ascertained based on entitlement. Unlike prior art round-robin scheduling, the invention allows priority groups to start round-robin distribution at various specified resources. Thus in block 112, each priority group is assigned a starting CPU for the round-robin distribution of its processes among the CPUs of the system. Block 112 is discussed in greater detail in FIG. 3 herein.

Block 114 designates the CPUs that need to be dedicated to particular priority groups to help those priority groups close the gap between the actual entitlements received since the last execution of the distributing algorithm and the expected entitlements. The dedicated CPUs are ascertained based on feedback data (obtained in block 108 of FIG. 1/FIG. 2) as well as on the starting CPU data for the priority groups (obtained in block 112 of FIG. 1/FIG. 3). Block 114 will be discussed in greater detail in FIG. 4 herein.

In block 116, the global schedule lock is acquired to ensure that when the processes associated with various priority groups are distributed in accordance with the inventive distributing algorithm, there is no conflicting scheduling or distributing of any process on the CPU queues. Since global locking is potentially an expensive operation with high overhead, global schedule lock only lasts until the distribution (block 118) is finished and is immediately released in block 120 to minimize impact on system performance.

The distribution block 118 itself is optimized to allow fair yet efficient distribution of processes in a decentralized and decoupled manner among the local CPU queues. In block 118, the processes associated with the priority groups are distributed among the CPUs. For each priority group, the distribution process starts at the CPU assigned to the priority group and distribution is made in a round-robin fashion while skipping over CPUs dedicated to other priority groups. If the last CPU is reached, the distribution starts again with the first CPU (CPU 0). An exemplary distribution is shown in Table 4 of Example A herein.

Figure 2:
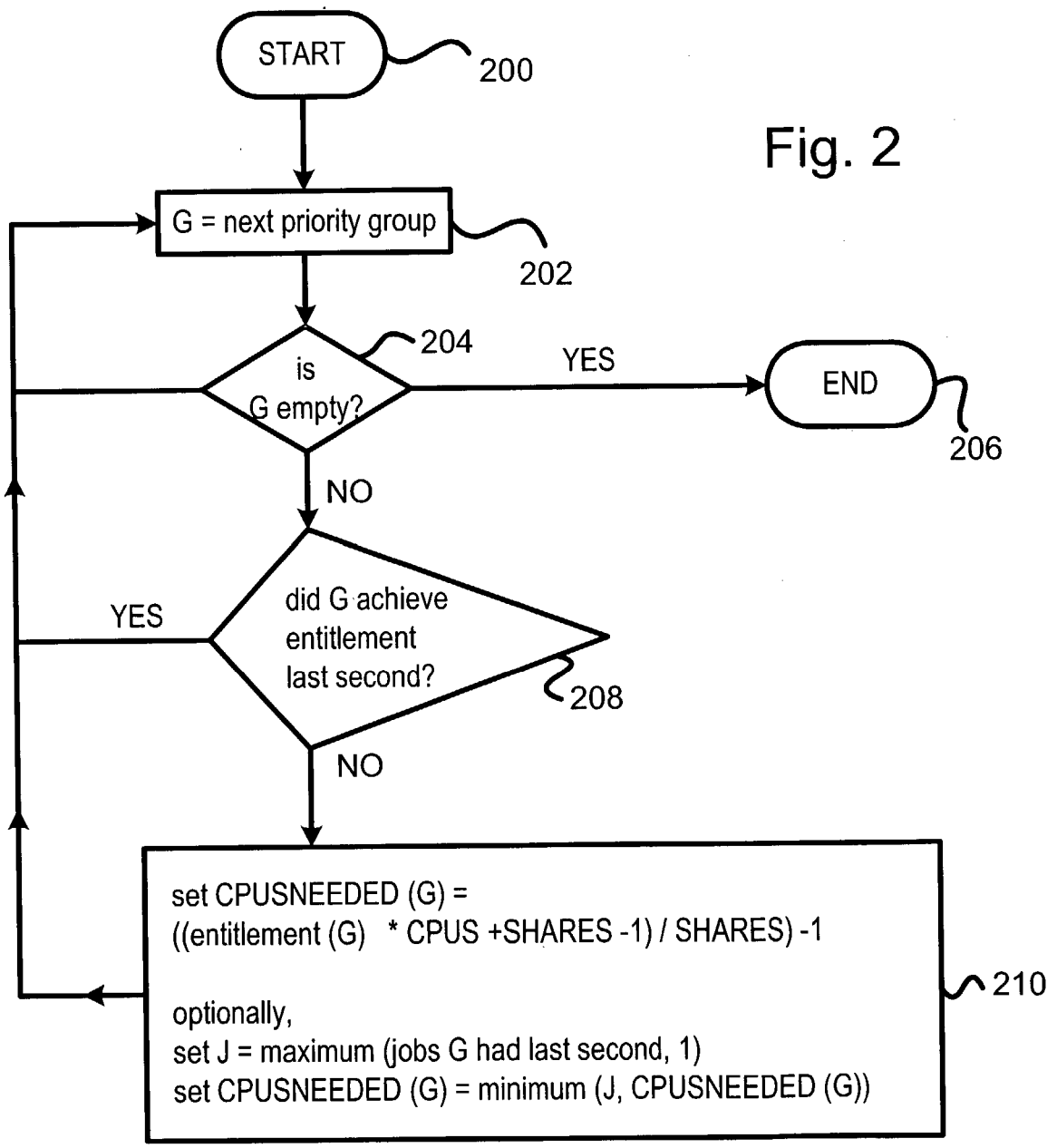
FIG. 2 shows, in accordance with one embodiment of the present invention, the major steps for determining the number of dedicated CPU needed, if any, to help bring a priority group's actual entitlement closer to its expected entitlement.

FIG. 2 shows, in accordance with one embodiment of the present invention, the major steps for determining the number of dedicated CPU needed, if any, to help bring a priority group's actual entitlement closer to its expected entitlement. FIG. 2 goes through each priority group in turn (blocks 202-206) and if the priority group under consideration did not obtain its expected entitlement since the last execution of the distribution algorithm (decided in block 208), block 210 computes the number of dedicated CPUs needed in order to assist this priority group to achieve its expected entitlement. In Example A, note in Table 3 that group 1 did not achieve its expected entitlement after the first execution of the distribution algorithm (45% actual entitlement versus 50% expected entitlement). FIG. 2 calculates that group 1 of Example A needs (599/100)−1 or four dedicated, unshared CPUs to help group 1 achieve its expected entitlement of 50%. In one embodiment, the computation truncates fractional values because we are only interested in whole resource units. These four dedicated CPUs are shown in Table 4 of Example A.

Optionally, block 210 ensures that the maximum number of CPUs dedicated to a particular priority group does not exceed the number of processes in that priority group. This is done to improve efficiency because if there are more CPUs dedicated to a particular priority group than there are processes in that priority group, at least one of the dedicated CPUs will be unused and is therefore wasted.

Figure 3:
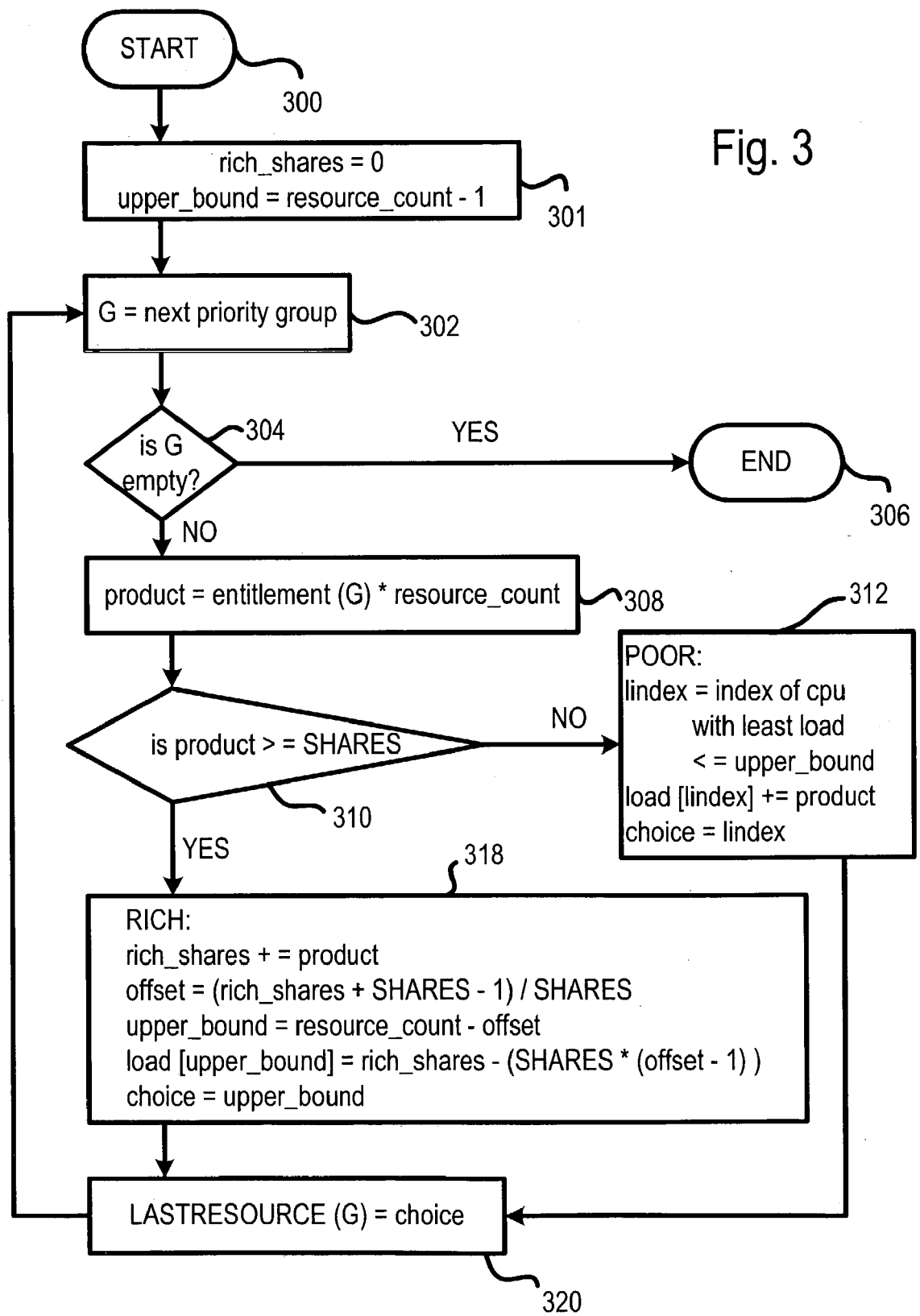
FIG. 3 shows, in accordance with one embodiment of the present invention, the major steps for ascertaining, for each priority group, the starting CPU at which the priority group can begin its round-robin distribution of its processes.

FIG. 3 shows, in accordance with one embodiment of the present invention, the major steps for ascertaining, for each priority group, the starting CPU at which the priority group can begin its round-robin distribution of its processes. Implicitly, FIG. 3 also ascertains the number of CPUs (whole and fractional) assigned to this priority group. The number of CPUs assigned to a particular priority group is ascertained based on the rule that seeks to ensure that each CPU does exactly one CPU's worth of work. When operating fairly, the entire system will do a total amount of work equal to the sum of all entitlements for each CPU (CPUS * SHARES). Thus, we consider the basic indivisible atom of work to be the CPU share. When expressing loads in these units, there is no round-off error as there might be in other schemes. As long as each group can achieve its goal of CPU shares, prioritization will be achieved. If any CPU is responsible for more or less than one CPU of work fairness will be adversely impacted. In this phase, we are most concerned with the quality of process likely to be on each CPU, not the quantity.

Generally speaking, the process of FIG. 3 starts with the highest ranked rich priority group and ascertains both the number of CPUs assigned to this priority group and the starting CPU number. The next highest ranked rich priority group is then assigned the appropriate number of CPUs and the appropriate starting CPU number to begin its round-robin distribution of its processes. FIG. 3 continues until all rich priority groups are assigned. Poor priority groups, on the other hand, compete for the left-over resources after the rich priority groups are all assigned.

Note that in the case of FIG. 3, the assignment of the CPUs to a given priority group is a non-exclusive assignment in the sense that processes associated with other priority groups may also share those CPUs if the round-robin distribution of the processes overlaps that of another priority group. With reference to Example A, priority group 1 is assigned CPUs 5-9, priority group 2 is assigned CPUs 1-4, and priority group 3 is assigned CPU 0. However, these CPUs are shared by processes of priority group 4, which begins the distribution of its processes at CPU 0 and proceeds in a round-robin fashion into CPU 1, CPU 2, CPU 3, and all the way into CPU 9 as shown. The only way to ensure that a CPU assigned to a particular priority group cannot be shared by processes associated with other priority groups is to dedicate that CPU to that particular priority group.

In accordance with one aspect of the present invention, the higher a rich priority group is ranked in the sorted list, the further it is kept away from the processes of the poor priority groups. This lowers the likelihood that poor priority group processes will be distributed, due to the round-robin distribution, into the CPUs assigned to the more highly ranked rich processes. With respect to Example A, since priority group 1 is the highest ranked in the sorted list (see Table 1), it is assigned to CPUs 5, 6, 7, 8, and 9, and processes of priority group 1 will be distributed in a round-robin fashion beginning at CPU 5. On the other hand, processes of poor priority group 4 start its distribution at CPU 0. Thus, there is a buffer of 4 CPUs (CPUs 1, 2, 3, and 4) that separate processes of poor priority group 4 from the CPUs assigned to the highest ranked rich priority group 1. The more CPUs we have, the bigger this protective buffer becomes.

If poor priority group 4 had only 2 processes (which is not the case of Example A but suppose hypothetically for the sake of discussion), the two processes of poor priority group 4 in this case would have been distributed to CPU 0 and CPU 1, and in that case, the processes of rich priority group 1 would not have to share CPUS 5-9 with processes of poor priority group 4. On the other hand, processes associated with rich priority group 1 do not have to share CPUs with processes of poor priority group 4 until the round-robin distribution of rich priority group 1 processes exhausted the CPU group assigned to rich priority group 1 (i.e., exhausts CPUs 5-9 and begins wrapping around to CPU 0). In other words, processes of rich priority group 1 can be distributed into CPUs 5-9 up to its percentage of entitlement (50%) before sharing of CPUs becomes necessary. In Example A, sharing is avoided by processes of rich priority group 1 since there are only five processes in rich priority group 1 and the round-robin distribution of the processes of rich priority group 1 does not wrap around to CPU 0.

The operation of FIG. 3 may be best understood with reference to Example A herein. Initially, rich_shares=0 and upper_bound=9 (block 302) as shown in Example A. FIG. 3 then cycles through each priority group in turn, starting from the highest ranked priority group in the sorted list until all priority groups are exhausted (blocks 302, 304, and 306). For each priority group under consideration, FIG. 3 decides whether the priority group is rich or poor using the variables "product" and "SHARES". The decision for priority groups 1-4 are shown in Example A wherein it is decided that priority groups 1, 2, and 3 are rich priority groups and priority group 4 is a poor priority group.

The variable LASTRESOURCE(priority group #) tracks the starting CPU for distributing the processes of the priority groups in accordance with the round-robin distribution scheme. The calculations of the values of LASTRESOURCE(priority group 1), LASTRESOURCE(priority group 2), and LASTRESOURCE(priority group 3) for the rich priority groups 1, 2, and 3 respectively are shown in blocks 318 and 320 and in Example A. As shown in Example A, rich priority group 1 starts its round-robin distribution at CPU 5, rich priority group 2 starts its round-robin distribution at CPU 1, and rich priority group 3 starts its round-robin distribution at CPU 0.

The calculation of the value for LASTRESOURCE(priority group 4) for poor priority group 4 is shown in blocks 312 and 320. In Example A, group 4 shares CPU 0. In general, poor priority groups may be fitted into the remaining CPU's, including any partially utilized CPU assigned to the lowest ranked rich priority group, using a best fit paradigm. Thus, the highest ranked poor priority group is assigned to start its round-robin distribution of its processes at the least loaded CPU among the CPUs that remain after the assignments to the rich priority groups (if any), and the next highest ranked poor priority group is assigned to start its round-robin distribution of its processes at the next least loaded CPU among the CPUs that remain after the first assignment to the highest ranked poor priority group, and so on. The resultant distribution is shown in Table 2 of Example A. A true best fit algorithm for the groups may be more accurate but is also more complicated and time consuming. The error associated with our approach is small enough (at worst half of a CPU's worth of work), and the more groups we have to work with, the better our approximation becomes. Also, because the worse case error is based on the amount of work done by the average CPU, the amount of error goes down with every added CPU.

Figure 4:
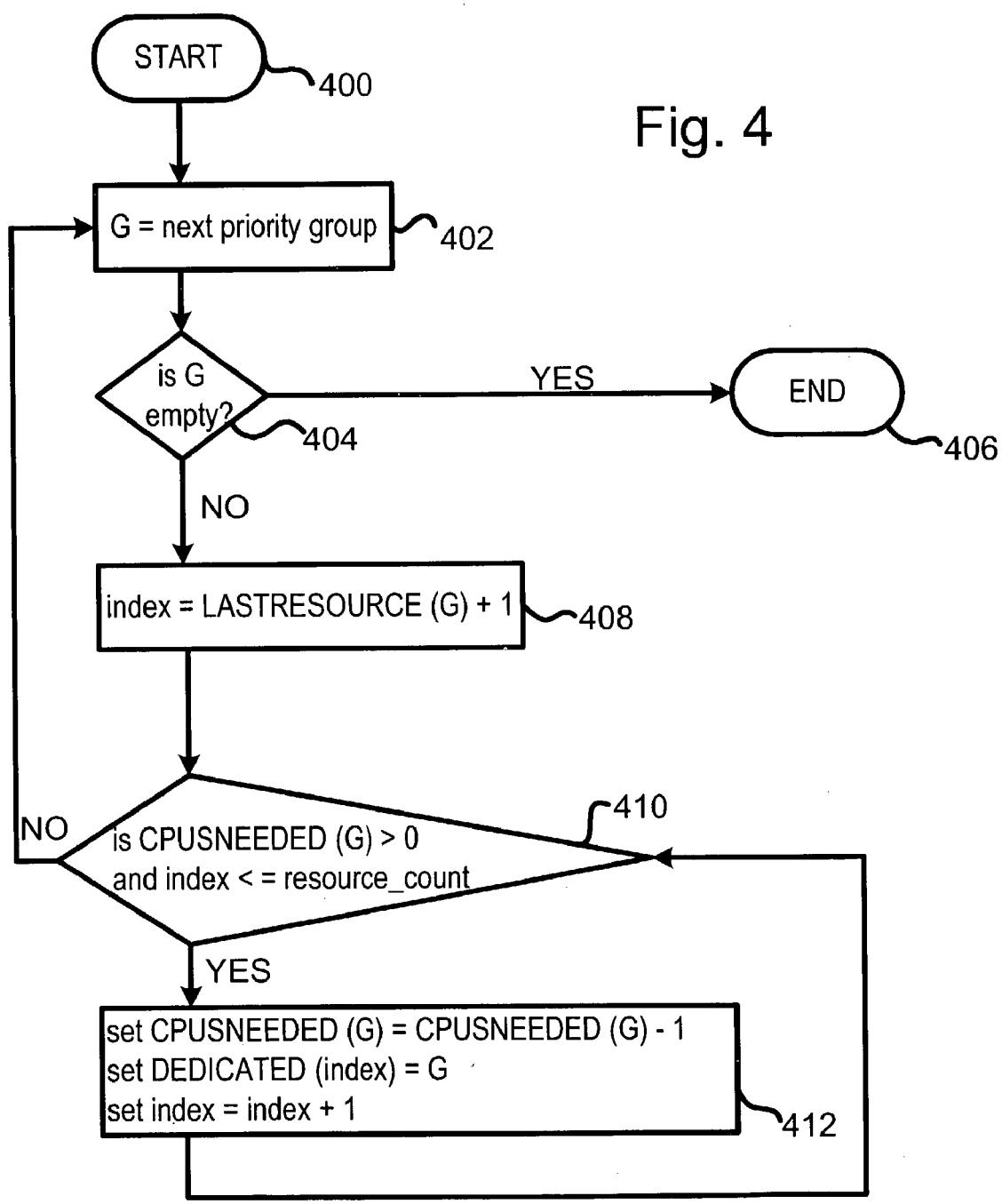
FIG. 4 illustrates, in accordance with one embodiment of the present invention, the major steps for creating dedicated CPUs.

FIG. 4 illustrates, in accordance with one embodiment of the present invention, the major steps for creating dedicated CPUs. It should be recalled that the invention employs feedback data in the form of performance data since the last execution of the distributing algorithm to decide whether it is necessary to dedicate CPUs to a particular priority group under consideration to correct for past distribution imbalance and if so, how many CPUs need to be dedicated (see FIG. 2). At a high level, FIG. 4 designates, for each priority group that requires CPU dedication (as decided by FIG. 2), dedicated CPUs starting at the CPU that is 1+LASTRESOURCE(priority group #) and continues to designate subsequent CPUs as dedicated CPUs until the number of CPUs dedicated equals the desired number of dedicated CPU ascertained earlier in step 108 of FIG. 1 and in FIG. 2. The first dedicated CPU is set to be 1+LASTRESOURCE(priority group #) since the first CPU in the CPU group assigned to a priority group (e.g., CPU 5 for priority group 1, CPU 1 for priority group 2, and so forth) may be shared.

Thus, with respect to Example A, since priority group 1 did not achieve its expected entitlement from the first execution of the distribution algorithm, FIG. 2 decides that priority group 1 needs 4 dedicated CPUs in the second execution of the algorithm. This information is employed to dedicate, using the steps of FIG. 4, CPUs 6, 7, 8, and 9 to priority group 1 in the second execution (see the discussion of the second execution in Example A and Table 4 therein).

Figure 5:
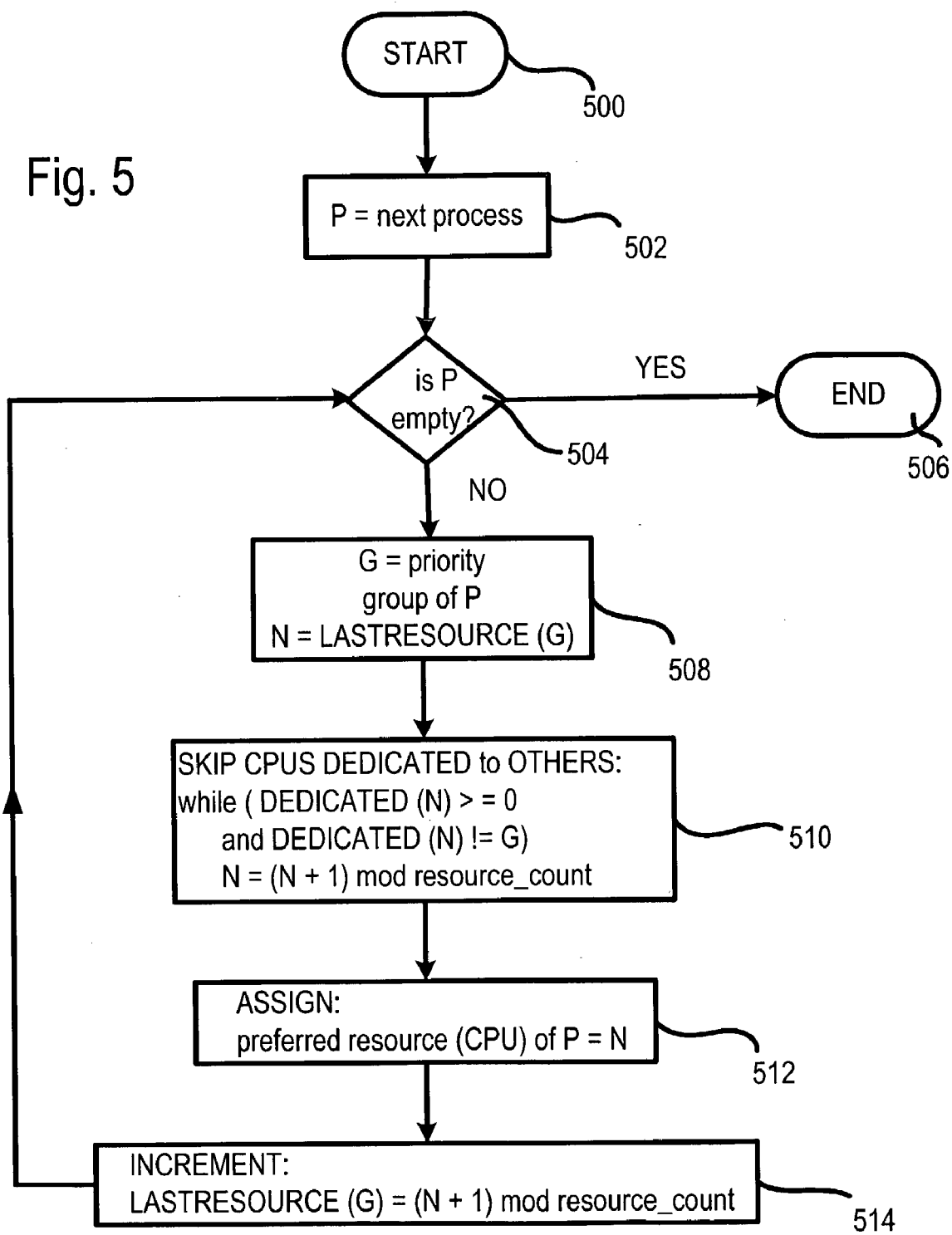
FIG. 5 illustrates, in accordance with one embodiment of the invention, the major steps for distributing the processes of the priority groups among the CPUs.

FIG. 5 illustrates, in accordance with one embodiment of the invention, the major steps for distributing the processes of the priority groups among the CPUs, equating to the DISTRIBUTE BLOCK 118 of FIG. 1. In FIG. 5, the processes are handled in a linear fashion until all processes are handled (blocks 502, 504, and 506). For each process, its associated priority group as well as the CPU # to be assigned next for the associated priority group is ascertained (block 508). Block 510 skips through all CPUs dedicated to other priority groups. Block 512 actually performs the assignment, and block 514 updates the CPU to be assigned next for the priority group under consideration. Note that the modulus operation ("mod resource_count") in blocks 510 and 514 ensures that when all CPUs are exhausted during round-robin distribution, the next CPU is again the first CPU (i.e., CPU 0). Thus rich priority group 1 starts at CPU 5 and distributes its 5 processes among CPUs 5-9. Rich priority group 2 starts at CPU 1 and distributes its 4 processes among CPUs 1-4. Rich priority group 3 starts at CPU 0 and distributes its 1 process at CPU 0. Poor priority group 4 starts at CPU 0 and distributes its 10 processes in a round robin fashion among CPUs 1-9.

As mentioned, global locking of the scheduling is activated for the duration of the distribute process of FIG. 5. Since global locking has the potential to degrade overall system performance, it is necessary to have a distribute process that is as efficient as possible. For the best possible fit, all processes would have to be divided up by priority group, an overhead in space and time we can ill afford. In such a case, a second pass over all processes and our allocation plan would then be required. This algorithm gives a very good fit in one pass and minimal time. Because it incorporates the round-robin techniques, in any case where we have more processes in each priority group than CPUs (over-committed) we achieve the same ideal balance as the unmodified round-robin. If at the opposite extreme, we are totally under-committed, and each priority group had exactly as many processes (or fewer) as it needed to achieve its entitlement, this algorithm also reaches the ideal. At any point between the common extremes, it provides a good compromise that can be adapted as needed.

Example B is included herein to illustrate that the distribution algorithm also yields good results when no poor priority groups are involved.

Figure 6:
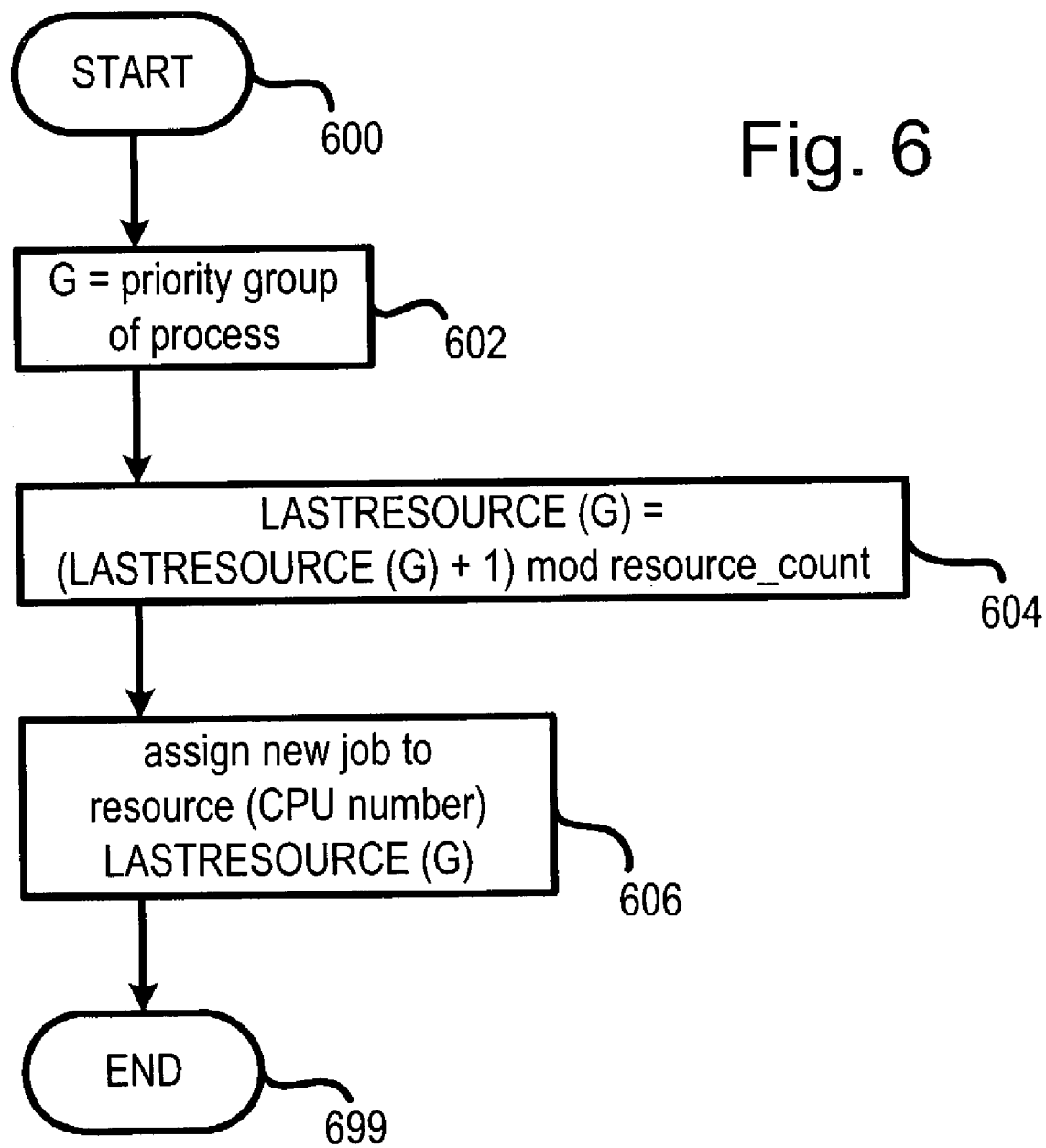
FIG. 6 illustrates, in accordance with one embodiment of the present invention, the major steps involved in handling newly forked processes.

FIG. 6 illustrates, in accordance with one embodiment of the present invention, the major steps involved in handling newly forked processes. Instead of automatically putting a newly forked process on the same CPU as the parent process, as is done in the prior art, the invention treats the newly forked process as just another process of the parent priority group, and employs the same distribution roadmap created by the immediately preceding execution of the distributing algorithm to distribute the newly forked process across the CPU's in the same round-robin manner. In other words, the newly forked process is appended to the list of processes of the priority groups and is distributed as if the newly forked process had been present all along. In this manner, the growth of processes is more evenly distributed across the CPU's than in the prior art case wherein forked processes are simply piled onto the CPU executing the parent process.

As can be appreciated from the foregoing, the invention shifts the paradigm from one that involves distribution based on purely number of processes on each CPU to one that takes into account the workload on each CPU. The invention ensures that each CPU has 1 CPU's worth of work for work distribution purposes (see FIG. 3 and discussion). This paradigm shift results in the ability to balance both raw process numbers and priority groups simultaneously, satisfying both of our constraints of performance and fairness. For a truly optimized scheduler, prior art would require computation and space proportional to the number of priority groups * processes * resources. This grows exponentially. By changing to this cross-sectional viewpoint, we have radically reduced the complexity to something closer to the number of priority groups+processes+resources. This model also improves performance by encouraging CPU affinity, and lowering the total number of process moves that take place on a system.

Furthermore, the invention advantageously includes a feedback mechanism wherein performance data (such as actual entitlement percentages of the individual priority groups) obtained since the last execution of the distribution algorithm is employed in the current execution of the distribution algorithm to dedicate CPU's to priority groups, thereby bringing the actual entitlement percentages of the priority groups even closer to the expected entitlement percentages.

Additionally, the invention advantageously includes a feed-forward mechanism to allow the same distribution policy to be employed to handle newly forked processes in order to maintain the balance for much longer periods without corrective intervention.

By creating distribution roadmaps or policies based on relative prioritization (such as entitlement percentages) and distributing processes to resources (such as CPUs) according to those distribution roadmaps or policies, the invention keeps the relative scheduled usage of the priority groups fairly close to the expected values. There is little, if any, that the OS needs to do to compensate in order to achieve acceptable actual percentages during the intervening period. In most cases, it is unnecessary for the OS to resort to expensive and complex compensation schemes (such as credit/debit schemes) to ensure fairness since the result achieved via distribution alone may already be within acceptable ranges. Thus the overall overhead involved in ensuring the fair sharing of the resources by the processes is substantially reduced.

More importantly, the invention is highly scalable to systems having a large number of resources (such as CPUs) and large number of priority groups. In fact, as the number of resources and/or priority groups increase, the fairness achieved using the inventive distribution technique improves. Example C illustrates the result achieved when there is a large number of priority groups involved, relative to Example A. Note the improved result when the number of priority groups is increased. As discussed earlier, this is due to the fact that more groups means that the fit for each CPU is better, and each is responsible for exactly one CPU's worth of work. Because it is designed to improve and maintain fairness and performance for increases in resources, processes, and priority groups, and does a least as well for the base cases, this invention is superior to prior art.

EXAMPLES

Example A

Suppose we have a computer system with 10 CPUs, representing the set of resources to be shared.
resource_count=10
sequence number=1

TABLE 1

List of groups, processes, and expected entitlements.

| GROUP | ENTITLEMENT | PROCESSES |
|-------|-------------|-----------|
| 1 | 50 | 5 |
| 2 | 35 | 4 |
| 3 | 10 | 1 |
| 4 | 5 | 10 |

First Execution:
Walking through FIG. 1, (100-110)
SHARES=100
LOAD[0-9]=0
We assume that the configuration has not changed. Since this is our first pass, we will ignore FEEDBACK until the next iteration.
(112) takes us to FIG. 3
rich_shares=0
upperbound=9
G=group 1
product=500
which is >=100
rich_shares=500
offset=5
upper_bound=5 (thus CPUs 5, 6, 7, 8, 9 are home for group 1)
load[5]=100
LASTRESOURCE(1)=5
G=group 2
product=350
which is >=100
rich_shares=850
offset=9
upperbound=1 (thus part of CPU 1, and all of 2, 3, 4 are home to group 2)
load[1]=50
LASTRESOURCE(2)=1
G=group 3
product=100
which is >=100
rich_shares=950
offset=10
upperbound=0
load[0]=50
LASTRESOURCE(3)=0
G=group 4
product=50 our first poor priority group
searching from 0 to 0, the least loaded is CPU 0 with a load of 50; load[0]=100;
choice=0.
LASTRESOURCE(4)=0
No more groups, return to FIG. 1.
(114) since CPUSNEEDED is all zero, we can skip CREATE DEDICATED
(118) DISTRIBUTION will be as shown in Table 2.

TABLE 2

Distribution achieved after first execution.

| CPU | PRIORITY GROUP MEMBERSHIP OF PROCESSES |
|---|---|
| 0 | 3, 4 |
| 1 | 2, 4 |
| 2 | 2, 4 |
| 3 | 2, 4 |
| 4 | 2, 4 |
| 5 | 1, 4 |
| 6 | 1, 4 |
| 7 | 1, 4 |
| 8 | 1, 4 |
| 9 | 1, 4 |

Even with isolated queues, the entitlements are achieved as shown in Table 3 if we use the simplest of scheduling algorithms, such as simply having the OS look at each local queue at each CPU and give each process time proportional to the entitlement of its priority group. With respect to CPU 9, for example, the amount of time granted to the process of priority group 1 will be 10 times the amount of time granted to the process of priority group 4 (50% entitlement for priority group 1 versus 5% entitlement for priority group 4).

TABLE 3

Expected versus actual entitlements for priority groups after first execution.

| GROUP | EXPECTED ENTITLEMENT | ACTUAL ENTITLEMENT |
|---|---|---|
| 1 | 50 | 45 |
| 2 | 35 | 38 |
| 3 | 10 | 7 |
| 4 | 5 | 10 |

Second Execution:
Because group 1 did not meet its entitlement, FIG. 2 yields CPUSNEEDED(1)=4, while CPUSNEEDED remains 0 for all other groups. From FIG. 3, LASTRESOURCE array will fall out the same as before. However, since we want 4 CPUs starting at LASTRESOURCE(1)+1, CPUs 6, 7, 8, and 9 are DEDICATED to group 1 by setting DEDICATED[6-9]=1 due to the operation of FIG. 4.
The following DISTRIBUTION (118) is achieved.

TABLE 4

Distribution achieved after second execution.

| CPU | PRIORITY GROUP MEMBERSHIPS |
|---|---|
| 0 | 3, 4, 4 |
| 1 | 2, 4, 4 |
| 2 | 2, 4, 4 |
| 3 | 2, 4, 4 |
| 4 | 2, 4 |
| 5 | 1, 4 |
| 6 | 1 (DEDICATED) |
| 7 | 1 (DEDICATED) |
| 8 | 1 (DEDICATED) |
| 9 | 1 (DEDICATED) |

Using the most basic algorithm for scheduling, the percentages achieved from the second scheduling will be.

TABLE 5

Expected versus actual entitlements for priority groups after second execution.

| GROUP | EXPECTED ENTITLEMENT | ACTUAL ENTITLEMENT |
|---|---|---|
| 1 | 50 | 49.1 |
| 2 | 35 | 38 |
| 3 | 10 | 7 |
| 4 | 5 | 5.9 |

This is much closer, with no active or expensive intervention from the OS. If there is a need to bring the actual closer, it can be done with minimal additional effort on the part of the fine grain policy.

Example B

Example B is an example showing that it is possible for all priority groups to be rich. Again assume that there are 10 CPUs to be shared.

TABLE 6

Distribution and actual entitlements for Example B.

| GROUP | EXPECTED ENTITLEMENT | LAST CPU | ACTUAL ENTITLEMENT |
|---|---|---|---|
| 1 | 50 | 5 | 50 |
| 2 | 30 | 2 | 30 |
| 3 | 20 | 0 | 20 |

If we assume the common case of being under-committed, i.e., there are fewer processes than CPUs, the biggest groups now have the most room implicitly blocked off for them. Whereas if we have the overloaded case, i.e., there are more processes than CPUs, the distribution is similar to plain round-robin except that the tendency for the first few CPUs to be overloaded to substantially lessened.

Example C

In example C, there is a large number of priority groups, many of which are poor.

TABLE 7

List of groups, processes, and expected entitlements. for Example C.

| GROUP | ENTITLEMENT | PROCESSES |
| --- | --- | --- |
| 1 | 30 | 3 |
| 2 | 25 | 3 |
| 3 | 15 | 2 |
| 4 | 8 | 1 |
| 5 | 7 | 1 |
| 6 | 5 | 1 |
| 7 | 4 | 1 |
| 8 | 3 | 1 |
| 9 | 2 | 1 |
| 10 | 1 | 1 |

Again, the total SHARES=100.

The first three groups are all rich.

Group 1 starts at CPU 7, and also has 8, and 9 in its range. load[7]=100

Group 2 starts at CPU 4, and also has 5, and 6. load[4]=50

Group 3 starts at CPU 3, and takes the other half of CPU 4. load[3]=100.

This leaves CPUs 0, 1, and 2 for the seven poor priority groups to split. groups 4, 5, and 6 each take the first unused CPU.

LASTRESOURCE[4]=0, load[0]=80
LASTRESOURCE[5]=1, load[1]=70
LASTRESOURCE[6]=0, load[2]=50

Now we start to double up.

LASTRESOURCE[7]=2, load[2]=50+40=90
LASTRESOURCE[8]=1, load[1]=70+30=100
LASTRESOURCE[9]=0, load[1]=80+20=100
LASTRESOURCE[10]=2, load[2]=90+10=100

So we see that all CPUs have exactly one CPU's worth of work to do. Although such is not always the case, the algorithm tends to perform better with more groups and more CPUs.

The actual entitlements achieved by simple OS distribution are shown in Table 8.

TABLE 8

Expected versus actual entitlements for priority groups of Example C.

| GROUP | EXPECTED ENTITLEMENT | ACTUAL ENTITLEMENT |
| --- | --- | --- |
| 1 | 30 | 30 |
| 2 | 25 | 26.2 |
| 3 | 15 | 13.8 |
| 4 | 8 | 8 |
| 5 | 7 | 7 |
| 6 | 5 | 5 |
| 7 | 4 | 4 |
| 8 | 3 | 3 |
| 9 | 2 | 2 |
| 10 | 1 | 1 |

While this invention has been described in terms of several preferred embodiments, there are alterations, permutations, and equivalents which fall within the scope of this invention. For example, although CPUs have been employed as exemplary resources in the examples herein, the invention should readily apply to any OS queues or user space queues. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for distributing processes among a plurality of resources, said processes being associated with a plurality of priority groups, comprising:

ascertaining whether a first priority group of said plurality of priority groups is rich, said first priority group of said plurality of groups being deemed rich if said first priority group is entitled to at least a whole one of said plurality of resources, said first priority group of said plurality of groups being deemed poor if said first priority group is entitled to less than said whole one of said plurality of resources;

distributing processes of said first priority group among at least a first subset of said plurality of resources in accordance with a first computer-implemented methodology if said first priority group is deemed a rich;

distributing processes of said first priority group among at least a second subset of said plurality of resources in accordance with a second computer-implemented methodology if said first priority group is deemed poor, said second computer-implemented methodology being different from said first computer-implemented methodology; and executing a round-robin distribution of said processes of said first priority group and a round-robin distribution of said processes of a second priority group proceed in a distribution direction that is parallel to a direction from a first starting resource toward a second starting resource among said plurality of resources, wherein a second group of resource being prior to a first group of resource with respect to said distribution direction.

2. The computer-implemented method of claim 1 further comprising:

sorting said plurality of priority groups based on relative priorities of said plurality of said priority groups with respect to said plurality of resources prior to said ascertaining, whereby said ascertaining is performed on individual ones of said plurality of priority groups based on priority ranking starting from the highest ranked priority group.

3. The computer-implemented method of claim 2 wherein said first computer-implemented methodology includes:

ascertaining said first group of resources among said plurality of resources, a size of said first group of resources corresponds to a relative priority of said first priority group among said plurality of priority groups, and assigning said first group of resources to said first priority group, said first group of resources including said first starting resource, whereby round-robin distribution of processes of said first priority group starts at said first starting resource.

4. The computer-implemented method of claim 3 further comprising:

ascertaining whether said second priority group of said plurality of priority groups is rich, said ascertaining whether said second priority group of said plurality of priority groups is rich occurs after said ascertaining whether said first priority group of said plurality of priority groups is rich, said second priority group of said plurality of groups being deemed rich if said second priority group is entitled to at least said whole one of said plurality of resources, said second priority group of said plurality of groups being deemed poor if said second priority group is entitled to less than said whole one of said plurality of resources, said second priority group being lower ranked in priority relative to said first priority group;

if said second priority group is deemed rich, performing steps a-b below:

a) ascertaining a second group of resources among said plurality of resources, a size of said second group of resources corresponds to a relative priority of said second priority group among said plurality of priority groups, said second group of resources being different from said first group of resources, and b) assigning said second group of resources to said second priority group, said second group of resources including a second starting resource, whereby said round-robin distribution of processes of said second priority group starts at said second starting resource, said second starting resource being different from said first starting resource.

5. The computer-implemented method of claim 3 wherein said relative priority is specified by an entitlement percentage with respect to said plurality of resources.

6. The computer-implemented method of claim 5 wherein said plurality of resources represents a plurality of CPUs.

7. The computer-implemented method of claim 5 wherein said plurality of resources represents one of a plurality of OS queues and a plurality of user space queues.

8. The computer-implemented method of claim 5 wherein said plurality of resources represents a plurality of network connections.

9. The computer-implemented method of claim 5 wherein said plurality of resources represents a plurality of I/O channels.

10. The computer-implemented method of claim 1 wherein said plurality of resources including a given resource that is not a resource in said first group of resources and in said second group of resources, said given resource being prior to said second group of resources and said first group of resources with respect to said distribution direction, said round-robin distribution of said processes of said first priority group proceeds along said distribution direction and along a first loop that starts from said first starting resources and then through said given resource and then through said second starting resource, said round-robin distribution of said processes of said second priority group proceeds along said distribution direction and along a second loop that starts from said second starting resource and then through said first starting resource and then through said given resource.

11. The computer-implemented method of claim 10 wherein a spawn process spawned from a process of said first priority group is appended to a list of processes of said first priority group and executed in turn in accordance with said first computer-implemented methodology.

12. The computer-implemented method of claim 10 wherein said round-robin distribution of said processes of said second plurality of resources skips over resources dedicated to said first priority group, said resources dedicated to said first priority group being ascertained from performance data pertaining to performance by processes of said first priority group that is achieved prior to said assigning said first group of resources to said first priority group.

13. The computer-implemented method of claim 10 further comprising:

ascertaining whether a third priority group of said plurality of priority groups is rich, ascertaining whether said third priority group of said plurality of priority groups is rich occurs after said ascertaining whether said second priority group of said plurality of priority groups is rich, said third priority group of said plurality of groups being deemed rich if said third priority group is entitled to at least said whole one of said plurality of resources, said third priority group of said plurality of groups being deemed poor if said third priority group is entitled to less than said whole one of said plurality of resources, said third priority group being lower ranked in priority relative to said second priority group and said first priority group;

if said third priority group is deemed poor, performing steps c-d below:

c) ascertaining a least loaded resource among remaining resources of said plurality of resources, said remaining resources representing resources that have not been assigned to priority groups that are ranked higher in priority relative to said third priority group;

d) assigning said least loaded resource to said third priority group, said least loaded resource being prior to said first group of resources and said second group of resources with respect to said distribution direction, whereby round-robin distribution of processes of said third priority group proceeds along said distribution direction and along a loop that starts at said least loaded resource then through said second starting resource then through said first starting resource.

14. An article of manufacture comprising a program storage medium having computer readable codes embodied therein, said computer readable codes being configured for distributing processes among a plurality of resources, said processes being associated with a plurality of priority groups, said computer readable codes comprising:

computer readable codes for ascertaining whether a first priority group of said plurality of priority groups is rich, said first priority group of said plurality of groups being deemed rich if said first priority group is entitled to at least a whole one of said plurality of resources, said first priority group of said plurality of groups being deemed poor if said first priority group is entitled to less than said whole one of said plurality of resources;

computer readable codes for distributing processes of said first priority group among at least a first subset of said plurality of resources in accordance with a first methodology if said first priority group is deemed a rich;

computer readable codes for distributing processes of said first priority group among at least a second subset of said plurality of resources in accordance with a second methodology if said first priority group is deemed poor, said second methodology being different from said first methodology; and computer readable codes for executing a round-robin distribution of said processes of said first priority group and a round-robin distribution of said processes of a second priority group proceed in a distribution direction that is parallel to a direction from a first starting resource toward a second starting resource among said plurality of resources, wherein a second group of resource being prior to a first group of resource with respect to said distribution direction.

15. The article of manufacture of claim 14 further comprising:

computer readable codes for sorting said plurality of priority groups of said plurality of said priority groups based on relative priorities with respect to said plurality of resources prior to said ascertaining, whereby said ascertaining is performed on individual ones of said plurality of priority groups based on priority ranking starting from the highest ranked priority group.

16. The article of manufacture of claim 15 wherein said first methodology includes:
- computer readable codes for ascertaining said first group of resources among said plurality of resources, a size of said first group of resources corresponds to a relative priority of said first priority group among said plurality of priority groups, and
- computer readable codes for assigning said first group of resources to said first priority group, said first group of resources including said first starting resource, whereby round-robin distribution of processes of said first priority group starts at said first starting resource.

17. The article of manufacture of claim 16 further comprising:
- computer readable codes ascertaining whether said second priority group of said plurality of priority groups is rich, said ascertaining whether said second priority group of said plurality of priority groups is rich occurs after said ascertaining whether said first priority group of said plurality of priority groups is rich, said second priority group of said plurality of groups being deemed rich if said second priority group is entitled to at least said whole one of said plurality of resources, said second priority group of said plurality of groups being deemed poor if said second priority group is entitled to less than said whole one of said plurality of resources, said second priority group being lower ranked in priority relative to said first priority group;
- computer readable codes for performing steps a-b below if said second priority group is deemed rich:
  a) ascertaining a second group of resources among said plurality of resources, a size of said second group of resources corresponds to a relative priority of said second priority group among said plurality of priority groups, said second group of resources being different from said first group of resources, and
  b) assigning said second group of resources to said second priority group, said second group of resources including a second starting resource, whereby round-robin distribution of processes of said second priority group starts at said second starting resource, said second starting resource being different from said first starting resource.

18. The article of manufacture of claim 16 wherein said relative priority is specified by an entitlement percentage with respect to said plurality of resources.

19. The article of manufacture of claim 14 wherein said plurality of resources includes a given resource that is not a resource in said first group of resources and in said second group of resources, said given resource being prior to said second group of resources and said first group of resources with respect to said distribution direction, said round-robin distribution of said processes of said first priority group proceeds along said distribution direction and along a first loop that starts from said first starting resources and then through said given resource and then through said second starting resource, said round-robin distribution of said processes of said second priority group proceeds along said distribution direction and along a second loop that starts from said second starting resource and then through said first starting resource and then through said given resource.

20. The article of manufacture of claim 19 further including computer readable codes for appending to a list of processes of said first priority group a spawn process spawned from a process of said first priority group and computer readable codes for executing said spawn process in turn in accordance with said first methodology.

21. The article of manufacture of claim 19 wherein said round-robin distribution of said processes of said second plurality of resources skips over resources dedicated to said first priority group, said resources dedicated to said first priority group being ascertained from performance data pertaining to performance by processes of said first priority group that is achieved prior to said assigning said first group of resources to said first priority group.

22. The article of manufacture of claim 19 further comprising;
- computer readable codes for ascertaining whether a third priority group of said plurality of priority groups is rich, ascertaining whether said third priority group of said plurality of priority groups is rich occurs after said ascertaining whether said second priority group of said plurality of priority groups is rich, said third priority group of said plurality of groups being deemed rich if said third priority group is entitled to at least said whole one of said plurality of resources, said third priority group of said plurality of groups being deemed poor if said third priority group is entitled to less than said whole one of said plurality of resources, said third priority group being lower ranked in priority relative to said second priority group and said first priority group;
- computer readable codes for performing steps c-d below if said third priority group is deemed poor:
  c) ascertaining a least loaded resource among remaining resources of said plurality of resources, said remaining resources representing resources that have not been assigned to priority groups that are ranked higher in priority relative to said third priority group;
  d) assigning said least loaded resource to said third priority group, said least loaded resource being prior to said first group of resources and said second group of resources with respect to said distribution direction, whereby round-robin distribution of processes of said third priority group proceeds along said distribution direction and along a loop that starts at said least loaded resource then through said second starting resource then through said first starting resource.

23. A computer system having therein a plurality of resources for sharing by a plurality of processes, said plurality of processes being associated with a smaller plurality of priority groups, processes in a first priority group of said plurality of priority groups being serviced by at least a first group of resources of said plurality of resources, said processes in said first priority group being distributed among resources of said first group of resources in a round-robin fashion starting from a first starting resource of said first group of resources, processes in a second priority group of said plurality of priority groups being serviced by at least a second group of resources of said plurality of resources, said processes in said second priority group being distributed among resources of said second group of resources in a round-robin fashion starting from a second starting resource of said first group of resources, said first priority group having a higher priority than said second priority group with respect to said plurality of resources, said second starting resource being different from said first starting resource, wherein round-robin distribution of said processes in said first priority group and round-robin distribution of said processes in said second priority group proceeds in a distribution direction along a direction that is parallel to a direction from said second starting resource toward said first starting resource among said plurality of resources, and wherein said second starting resource is prior to said first starting resource with respect to said distribution direction.

24. The computer system of claim 23 wherein said first priority group is entitled to at least a whole one of said plurality of resources.

25. The computer system of claim 24 wherein said second priority group is entitled to at least said whole one of said plurality of resources.

26. The computer system of claim 24 wherein said second priority group is entitled to less than said whole one of said plurality of resources.

27. The computer system of claim 26 wherein said second starting resource represents a least loaded resource of remaining resources, said remaining resources represent resources of said plurality of resources that remain after resources have been assigned to all priority groups entitled to at least said whole one of said plurality of resources.

28. The computer system of claim 24 wherein at least one resource in said first group of resources is temporarily dedicated to said first priority group to the exclusion of other priority groups.

29. The computer system of claim 23 wherein said plurality of resources represents a plurality of CPUs.

* * * * *

UNITED STATES PATENT AND TRADEMARK OFFICE
CERTIFICATE OF CORRECTION

PATENT NO. : 7,360,219 B2 Page 1 of 1
APPLICATION NO. : 10/318822
DATED : April 15, 2008
INVENTOR(S) : Scott Alan Rhine It is certified that error appears in the above-identified patent and that said Letters Patent is hereby corrected as shown below:

In column 20, lines 9-10, in Claim 22, after "comprising" delete ";" and insert -- : --, therefor.

Signed and Sealed this

Fifth Day of August, 2008

JON W. DUDAS
*Director of the United States Patent and Trademark Office*